United States Patent [19]

Honings

[11] Patent Number: 5,350,290
[45] Date of Patent: Sep. 27, 1994

[54] MANIFOLD AND VALVING ARRANGEMENT FOR DOUGH DIVIDER

[75] Inventor: Kenneth C. Honings, Chesterfield, Va.

[73] Assignee: AMF Machinery Systems, Inc., Richmond, Va.

[21] Appl. No.: 5,622

[22] Filed: Jan. 19, 1993

[51] Int. Cl.5 .................................................. A23P 1/12
[52] U.S. Cl. .................................... 425/311; 137/883; 251/8; 425/382 R; 425/382.4; 425/464
[58] Field of Search ................ 137/883, 886; 251/8; 425/145, 382 R, 382.4, 447, 464, 308, 311

[56] References Cited

U.S. PATENT DOCUMENTS

| | | | |
|---|---|---|---|
| 2,481,275 | 9/1949 | Ambrette | 425/382 |
| 2,931,387 | 4/1960 | Fleming | 137/883 |
| 4,015,926 | 4/1977 | Nehmey | 425/382.4 |
| 4,076,477 | 2/1978 | Hacke | 425/382 R |
| 4,233,018 | 11/1980 | Chinfen | 425/382.4 |
| 4,337,791 | 7/1982 | Tech et al. | 251/8 |
| 4,688,753 | 8/1987 | Tseng et al. | 251/8 |
| 4,895,341 | 1/1990 | Brown et al. | 251/8 |
| 5,046,940 | 9/1991 | Cummings | 425/239 |

*Primary Examiner*—Jay H. Woo
*Assistant Examiner*—Robert B. Davis

[57] ABSTRACT

An apparatus and method for dividing a mass of dough into a plurality of smaller volumes for buns and the like of uniform weight which includes a manifold having internal dividers and monolithic conduits for dividing the dough into a plurality of streams. The manifold has a large volume to surface area and divides the dough under relatively low pressure of preferably 40 to 45 pounds per square inch gauge pressure. The apparatus also utilizes restrictors to fine tune the flow rates of the separate streams. The restrictors are flexible tube conduits that pass through a valve assembly having adjustable pressure bars that pinch the flexible tubes to vary their opening.

15 Claims, 10 Drawing Sheets

MANIFOLD AND VALVING ARRANGEMENT FOR DOUGH DIVIDER

This invention relates to a dough divider for the production of buns and alike and more specifically relates to an improved manifold and valving arrangement for such bun dividers.

BACKGROUND OF THE INVENTION

This invention is an improvement on the invention shown in U.S. Pat. No. 4,948,611 which is incorporated herein by reference. While the invention shown in the patent was a substantial advance in the technology, there still existed occasional problems relating to bun spotting and blistering on the bun surface. Usually these problems relate to dough products that are left to rise in the pan with no forming or rolling processes after running through a sheeter roller or head roller. It is unclear exactly what causes these problems.

The new manifold and valving arrangement of this invention has served to substantially improve the previous arrangement as it reduces the internal pressure placed upon the dough and has improved the surface area to volume ratio. It is believed that higher pressures have a detrimental effect on the cellular structure and/or the longevity of the yeast in the dough product. Also the higher pressures are almost always accompanied by undesirable heat buildup. Preferably, the new arrangement uses a cut-off block with diameters permitting a product volume ratio (length to width) as extruded through the block prior to cut off close to a ratio of 1:1. While it is important that the pressure within the manifold be decreased, it is also important that the pressure be maintained above a minimum amount to avoid a phenomenon that allows the flow of the product to become unstable and create scaling problems. When the minimum pressure is maintained within the manifold accurate scaling is easily obtained.

The dough products that are normally run through the manifold are typically 40 to 45% moisture. The moisture contained within the product is held in the protein cell structure of the gluten forming "pockets" of water. The product must be handled carefully to avoid damaging the outer pockets of water. If the outer pockets are damaged, water is released and collects on the outside surface of the dough. The water collecting on the outside of the product will tend to make the product sticky and difficult to "machine" Effects of this situation are evident at the cut off knife, at the rounding bars and after the product is baked. Rupturing the water pockets may be caused by friction along the inside surface of the extrusion equipment. In a situation where there is a long narrow tube in which the product must flow, there is more volume of product which actually touches the wall of the tubing- The ratio between the total surface area of the conduit or pipe as compared to the total volume of the inside of the conduit is a quantitative measure of the percent of cellular rupturing occurring in the product. By decreasing the total surface area to the total volume of the vessel, the percentage of ruptured cells in the products will also be decreased proportionately. This decrease in cellular rupturing will increase the machinability of the product thereby decreasing the need for downstream efforts such as air bars and blower hoods. Also there is a decrease in the sensitivity of the rounder bar machine, less leakage at the rounder bars and a more consistent baked product.

The manifold of this invention yields a much lower surface area to manifold area ratio then the previous tube-style manifold.

SUMMARY OF THE INVENTION

The new invention comprises a manifold which is formed with at least part of the conduits integral therewith and shaped to form a smooth flow of the dough into separate streams with reduced pressure, a relatively low surface area to volume ratio and minimum disturbance of the dough as it is extruded into separate streams to be cut off into individual buns and the like. The individual streams have adjustable restrictors to fine tune the flow rate so each stream is flowing at the same rate through the conduit so that accurate scaling is maintained. The restrictors are preferably in the form of pinch valves which form an important aspect of the invention. Not only can the pinch valves be used to fine tune the flow rate in a smooth fashion with minimum disturbance of the individual dough streams but can be utilized to completely cut off such streams when desired.

BRIEF DESCRIPTION OF THE DRAWINGS

Further understanding of the advantages of the present invention, together with additional features contributing thereto, will be apparent from the following description of the preferred embodiment when read in conjunction with the accompanying drawings wherein.

DETAILED DESCRIPTION OF THE PREFERRED EMBODIMENT

Figure 1:
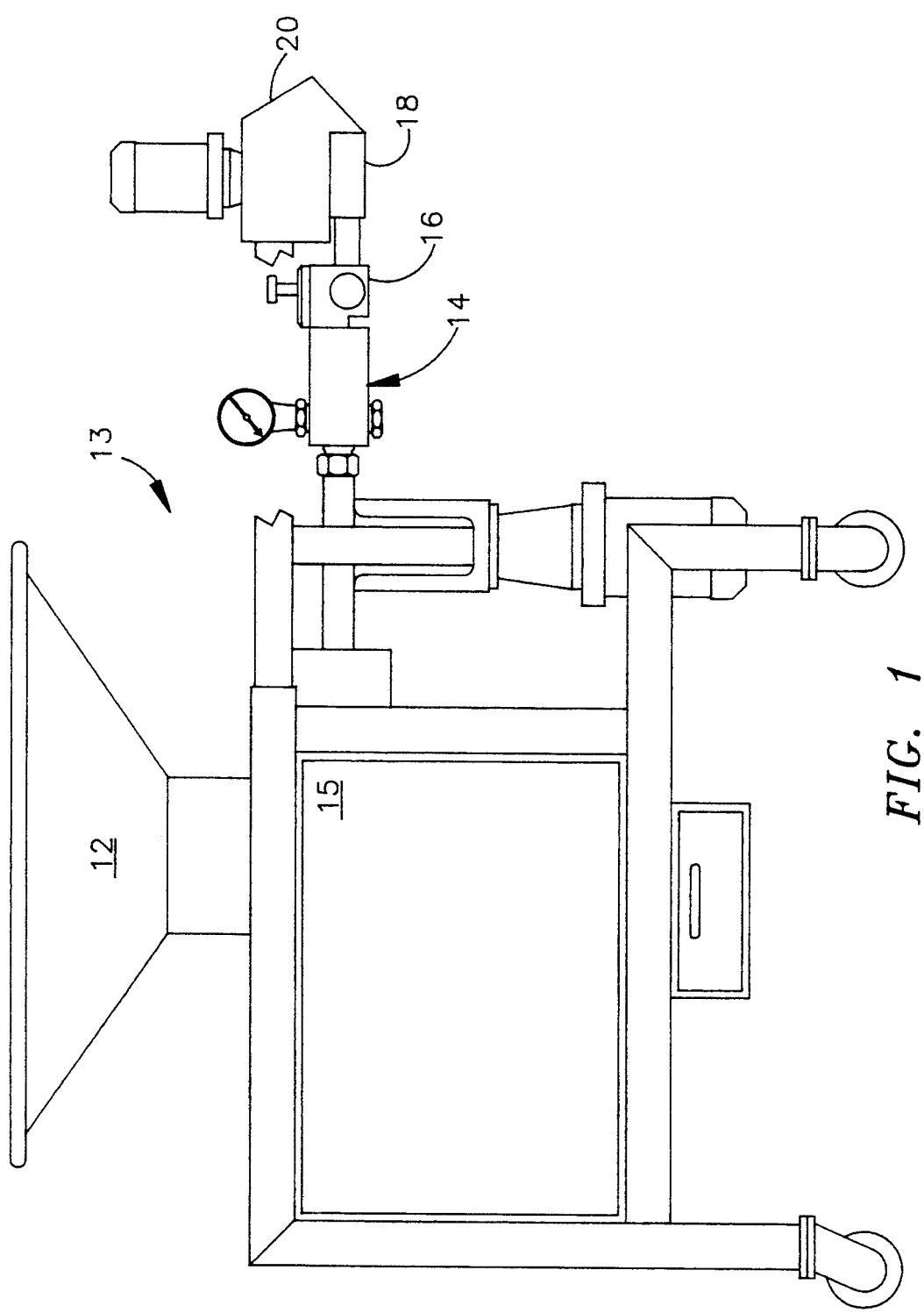
FIG. 1 is a schematic side view of the dough divider with improved manifold and valve arrangement.
Figure 2:
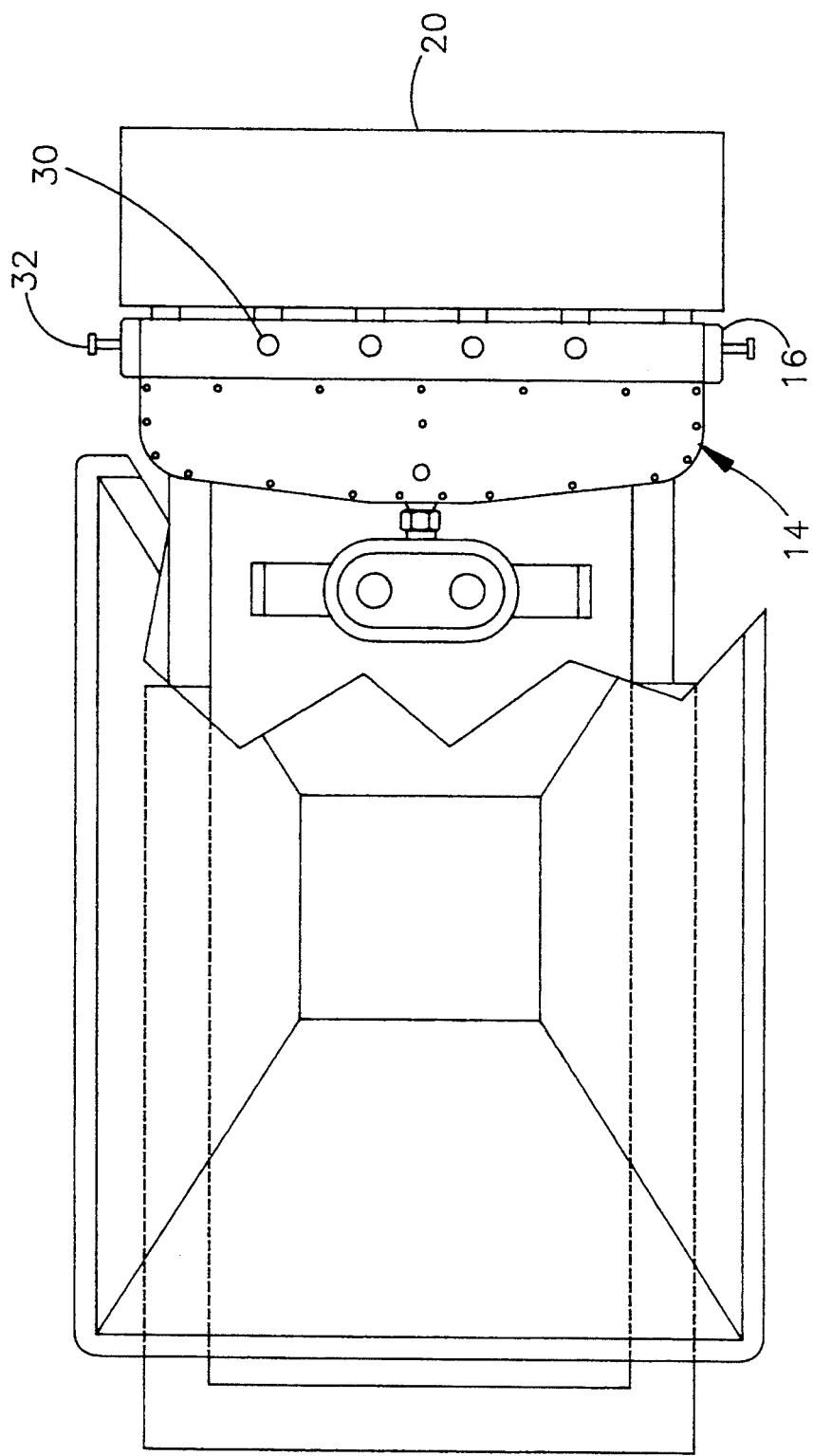
FIG. 2 is a plan view of FIG. 1.
Figure 3:
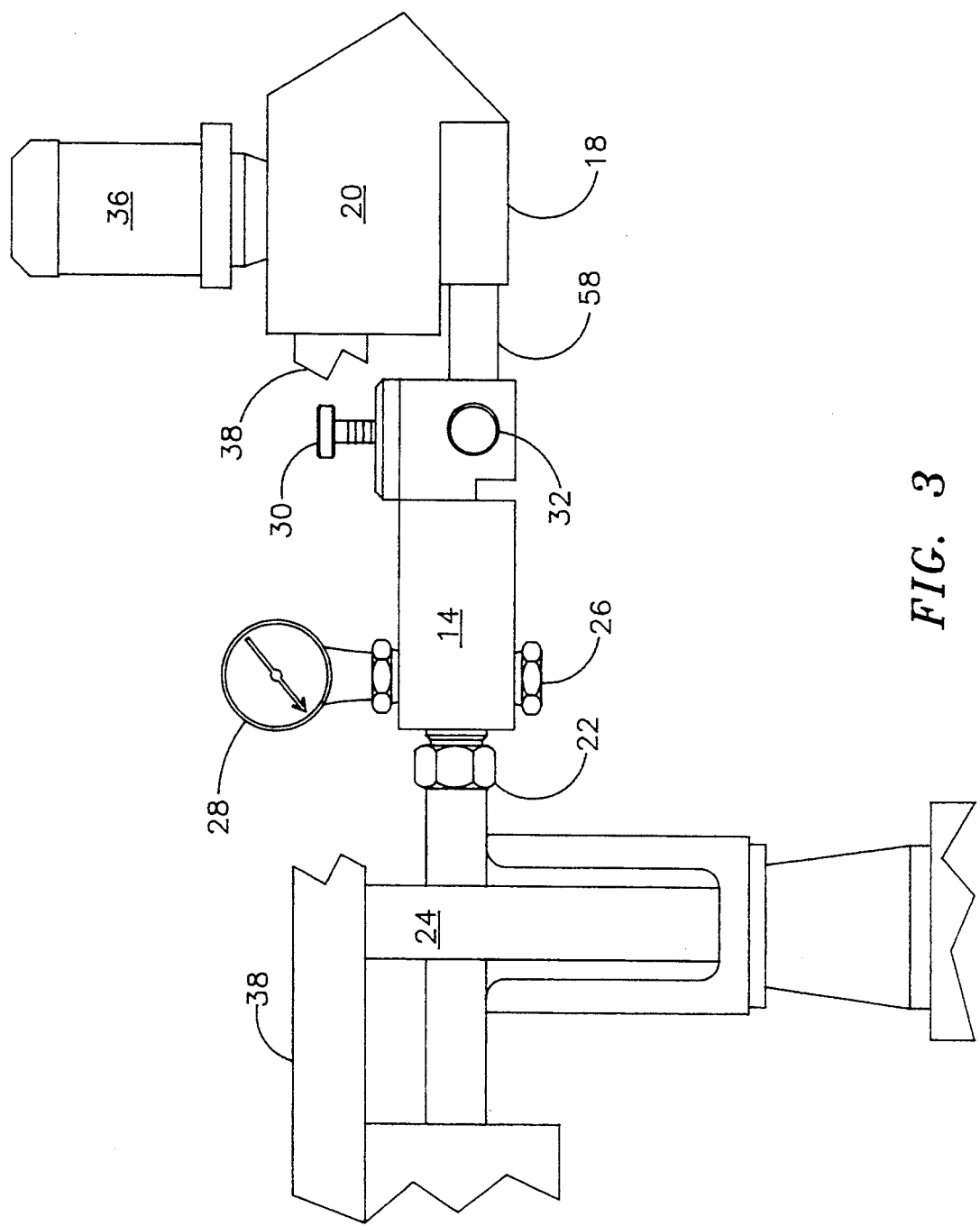
FIG. 3 is an enlarged schematic side view of a portion of FIG. 1 showing the manifold and valve assembly.

With reference to FIGS. 1 and 2 there is shown a dough divider 13 having a hopper 12 feeding dough from the bottom thereof through an auger conveyor dough pump 15 (not shown in detail but of the type used in U.S. Pat. No. 4,948,611) to a manifold assembly 14 having a restrictor or pinch valve assembly 16, an extrusion assembly or block 18, and a cut-off mechanism 20. The dough pump 15 provides a stream of dough of substantial uniform density under pressure to the manifold assembly 14. With reference to FIG. 3, which is an enlarged view of a part of FIG. 1, there is shown a readily detachable coupling 22 connecting the manifold 14 to the metering pump. The metering pump is not shown as it is located behind the metering pump mount 24. There are two mounts 24 hanging down on the side.

Also shown in FIG. 3 is a clean out port 26 to which is attached a source of hot water for flushing out the entire manifold and valving arrangement on a periodic basis. The pressure indicator 28 shows the pressure placed on the dough in the manifold during the operation of the apparatus.

Attached to the manifold 14 at its outlet is the restrictor valve assembly 16 which has a number of restrictor valves adjusted by four top valve adjusting handles 30 that adjust from a vertical or top direction and two side valve adjusting handles 32 located at each end to adjust from a side direction as will be more readily seen in later figures. The inlet and outlet of the restrictor valve assembly 16 is through a flexible connector tubing or conduit 58 that connects into the extrusion assembly or block 18 at the exit end and to the outlet of the manifold at the entrance end. The extrusion block has a plurality of openings to the right (not shown) from which the dough is extruded and cut off by the cut-off mechanism 20 which is driven by drive motor 36. The openings in said extrusion assembly each have an inlet and are connected to an outlet end of said flexible conduit 58 and an outlet end for extruding divided streams of dough. As the plurality of divided streams of dough are extruded, they are all periodically and simultaneously cut off into a plurality of pieces of dough of substantially uniform weight. The details of this arrangement is best shown in the above identified patent. Part of the frame 38 for the mechanism has been broken away for better illustrating the apparatus.

Figure 4:
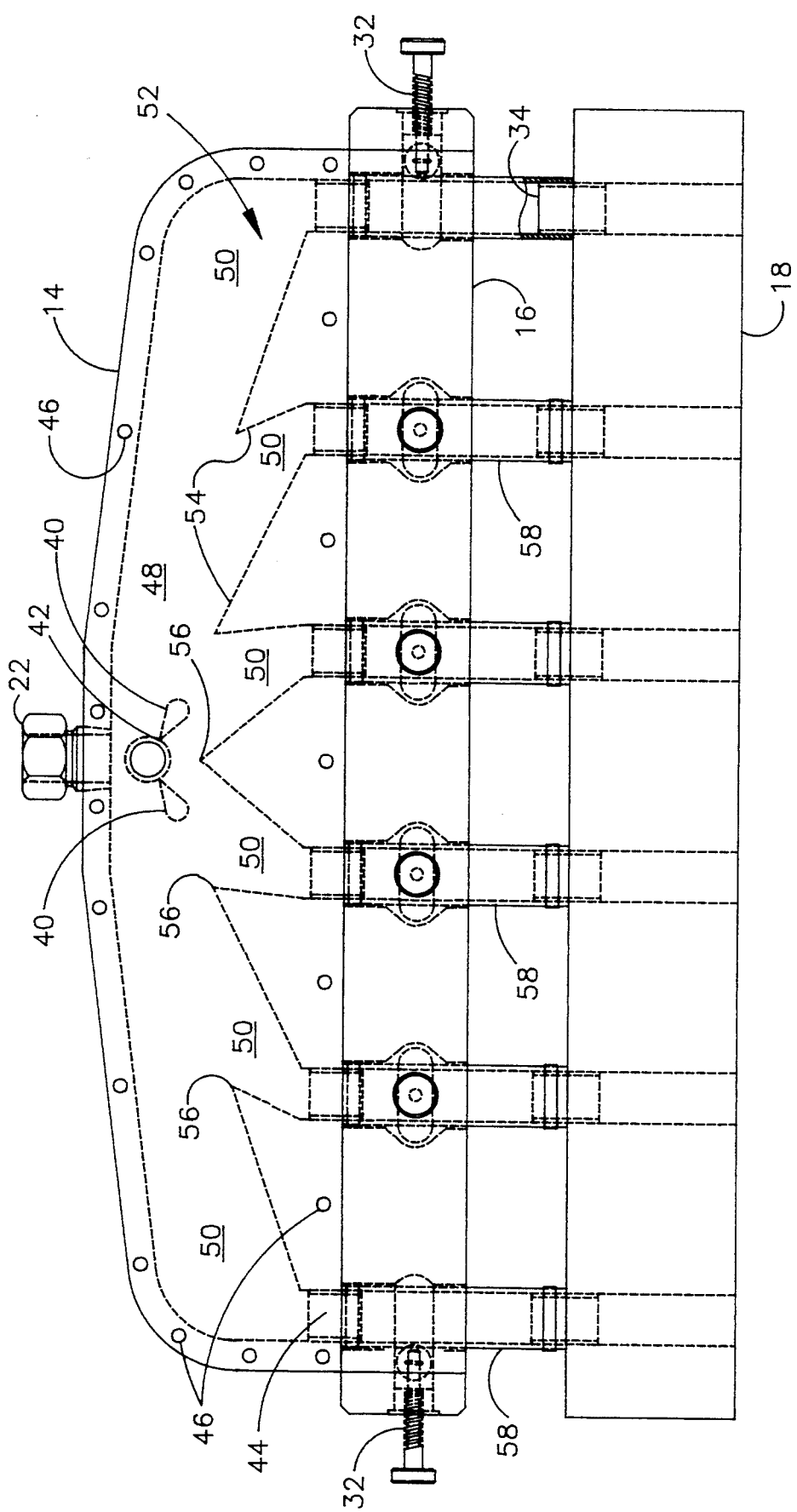
FIG. 4 is a schematic plan view of the manifold and valve assembly.

With reference to FIG. 4 there is shown a plan view of the manifold assembly 14. It has an inlet with inlet coupling 22 which is readily detachable from the rest of the apparatus and side valve adjusting handles 32. The top valve adjusting handles 30 are not shown so that the view of the valving can be better illustrated.

The flow of the dough first comes through the coupling 22 at the inlet. It then goes against the two diverter separators 40 bridging the height of the inside of the manifold. Each diverter separator 40 has a leading knife edge 42 to cut the dough into separate streams. Behind the knife edge is the body of the diverter separator which does the diverting. The two diverter separators shown divide or separate the dough and then divert the dough product into three streams. A single diverter separator or additional diverter separators may be used, but two are preferred.

The manifold assembly 14 has a manifold area 48 where the dough is divided or separated and diverted towards a number of integral conduits 50 in the conduit area 52.

In the manifold assembly shown in FIG. 4, there is illustrated six integral conduits or passageways 50. Other manifold assemblies could be made with 4 or 8 or any desired number. Each of the integral passageways or conduits 50 include side walls 54 shown in dotted lines. The two side walls at their upstream end are spaced apart to form a funnel opening to divert dough into the integral and internal conduits which are formed as a part of the manifold assembly.

Figure 10:
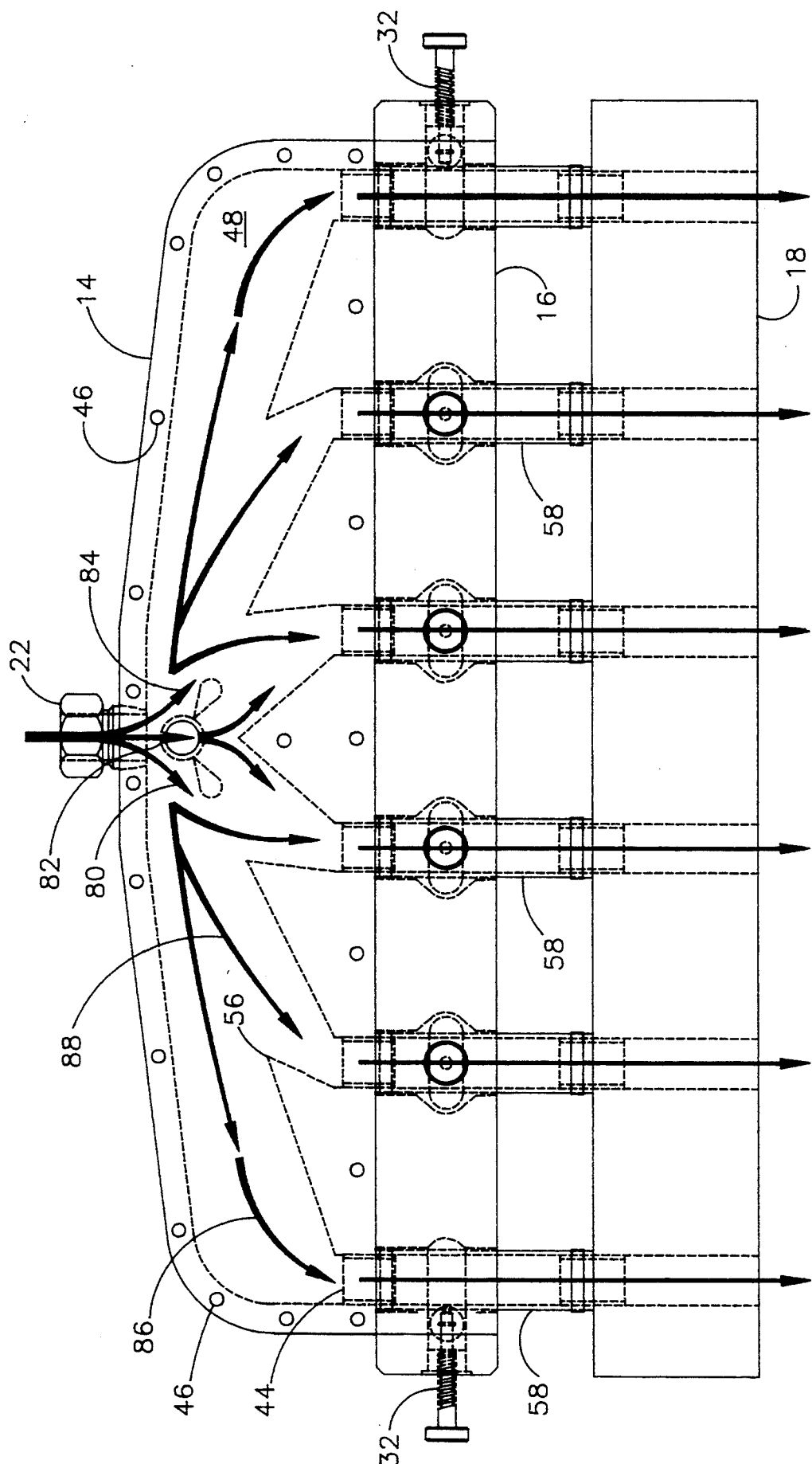
FIG. 10 is a schematic plan view of the manifold and valve assembly showing the flow of the dough.

The side walls extend generally in the direction of the approaching stream of dough. As seen in FIG. 4 and 10, the side walls of the two innermost internal conduits have their walls only slight bent towards the inlet to the manifold assembly whereas the side walls of the outermost internal conduits are very substantially bent towards the inlet. Each of the internal conduits 50 also have a top and bottom wall that are substantially flat but slightly taper towards one another as they converge in the direction of the outlet.

Adjacent side walls of adjacent internal conduits converge upstream towards one another to form a divider cutting edge 56 which serves to divide the oncoming stream of dough into two streams with each stream directed into the adjacent internal conduit 50. As shown in FIG. 10, there are five of these divider cutting edges 56 for the six internal conduits. These divider cutting edges function as knives to cut and divide the dough and extend from the top to the bottom of the openings to the internal conduits.

The side walls and top and bottom walls of each of said internal conduits converge in the downstream direction to form a circular conduit of a diameter for conducting each divided stream of dough to the cut-off mechanism 20.

This convergence may take place a considerable distance before the internal conduits exit from the manifold assembly but preferably it takes place just prior to said exit where it is connected with a flexible connector of tubing 58 which conducts the divided streams of dough through a restrictor and onto the entrance to the extrusion assembly.

Thus each stream of dough is carried by a conduit which has an upstream funnel opening converging to a circular opening. At least part of the conduit is internal and integral with the manifold assembly. If desired, all of the conduit and restrictors may be placed internally and integrally with the manifold assembly.

While at least part of the individual conduits are internal and monolithically an integral part of the manifold assembly, they may be internally located but not part of a monolithic piece of material such as using a suitable shaped piece that integrates with the manifold assembly but drops in or is bonded in but not monolithic with the manifold assembly by being machined in or molded in.

The manifold assembly internal cavities are preferably machined in or molded in with a base part 68 and cover part 66 having respectively a bottom wall and a top wall. The top wall and bottom wall are generally flat except for the fillets and, when assembled, taper slightly towards one another.

The sidewalls, divider cutting edges and leading knife edges are all radiused or rounded into fillets at the top and bottom of the manifold as better seen in FIG. 11 which will be discussed further infra. The top and bottom of the manifold assembly are held together by a series of pins 46. These pins may be bolts or other fasteners or may be augmented or replaced by adhesives, ultrasonic welds or other suitable fastening methods.

Each individual conduit 50 is connected to a 2 inch flexible tubing 58 which serves both as an extension of the conduit 50 and a part of a pinch valve assembly 16. The exit end of the flexible tubing 58 is connected to the extrusion block 18 through suitable connectors 34 from which the individual streams of dough are extruded and cut off to make buns and the like.

Figure 11:
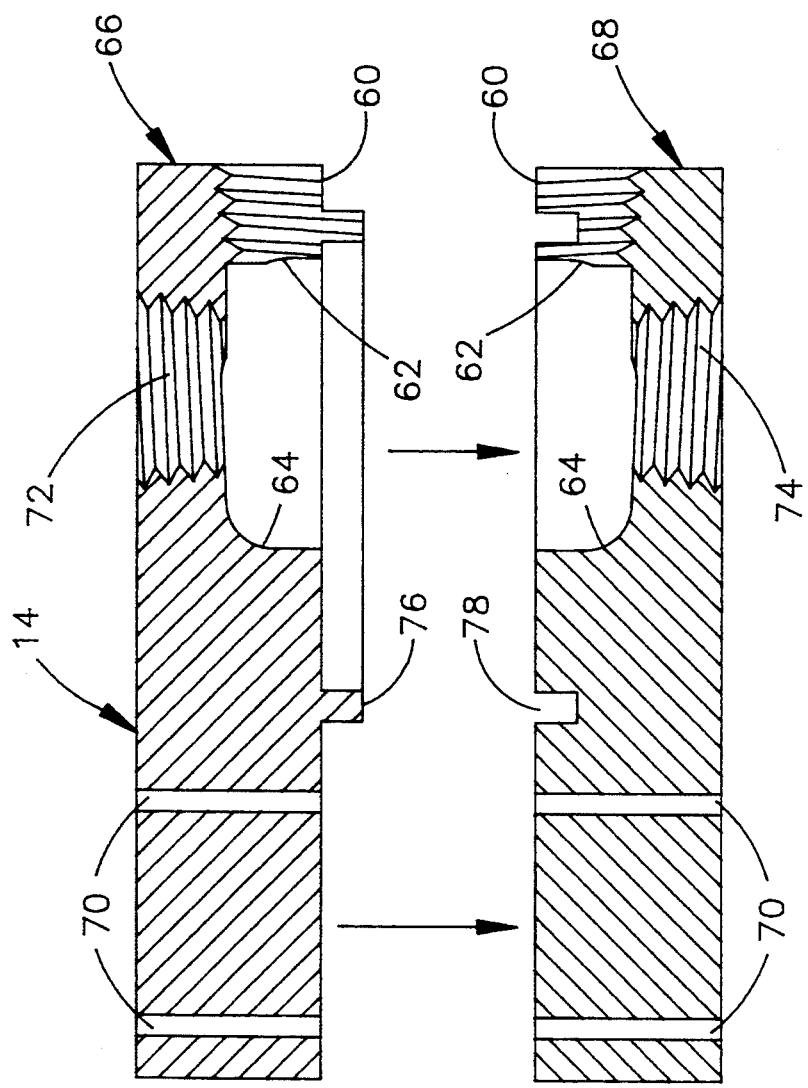
FIG. 11 is a schematic sectional broken apart manifold taken on the center longitudinal vertical plane of FIG. 10.

With reference to FIG. 11 there is shown the two major pieces of the manifold assembly 14 exploded in a cross sectional view taken along the longitudinal center plane of the manifold assembly. There is an entrance opening 60 to accommodate the coupling 22. The manifold cavity or area 48 is clearly radiused or rounded at 62. This radius is preferably ⅜ inch and is used at all the internal corners. The radius at the divider cutting edge 56 has its radius shown at 64. The cover 66 of the manifold is attached to the manifold base 68 through coaxial holes 70 by threaded pins 46 which hold the manifold cover 66 to the manifold base 68. The threaded opening 72 is for mounting of the pressure indicator 28 and threaded opening 74 is for receiving the clean out port connector 26. Surrounding the manifold area or cavity 48 is a tongue 76 in the manifold cover and receiving groove 78 in the manifold base. When the manifold cover is assembled to the manifold base the tongue and groove provide a better seal for the manifold cavity. Preferably the manifold cover and manifold base are substantially the same thickness as shown in FIG. 11. However, one could be thicker than the other and they could be of identical shapes so that a single molding could be used for both the cover and the base. However, in this case the tongue and groove joint would not be utilized.

With reference to FIG. 10 which is similar to FIG. 4, the flow lines of the dough are better shown. Here the dough enters a single inlet or entrance opening 60 through coupling 22 and is immediately divided into three similar streams by the two diverter separators 40. First, the dough is separated or divided by the leading knife edge 42 whose top and bottom are radiused or rounded into the manifold cavity as mentioned earlier. After being separated by the knife edge, the dough is then diverted into three major streams, the first being the left stream 80, a second being the center stream 82, and the third being the right stream 84. The left stream 80 proceeds through the manifold cavity 48 until it contacts the divider cutting edge 56 which divides the left stream 80 into two substreams the first and left substream 86 proceeding to the left most integral internal conduit and right substream 88 proceeding to the adjacent integral internal conduit. The center stream 82 and right stream 84 are similarly divided so that the dough is separated into four additional streams that flow into the individual integral internal conduits. The divided dough stream then flows through the individual pinch valve assemblies or restrictor assemblies 16 and then flows in six streams at an equal rate through the extrusion block 18 to be cut off into buns.

Preferably all of the separation or division of the dough is done by the two leading knife edges 42 of the two separator diverters 40 and the five divider cutting edges 56 in the manifold cavity so that the dough is sheared rather than torn. These edges, as mentioned earlier, are radiused into the manifold cover and manifold base. Tearing of the dough releases water and so tearing is minimized as much as possible. Water is almost one-half of the dough and rough handling by tearing or rubbing can release the water from the dough. The manifold cavity is designed to get as much volume to surface area as practically possible, minimize pressure required to move the dough and have smooth flow lines to avoid the dough hanging up anywhere.

The manifold assembly design permits a continuous flow of the dough through the manifold cavity with minimum interruptions and a minimum of surface area in contact with the dough as compared to the volume being processed. The manifold assembly is designed to decrease the pressure on the dough as much as practical.

There must be a minimum pressure to maintain proper scaling and have proper flow through the manifold assembly. This minimum pressure is approximately 20 psi (pounds per square inch). Excessive pressures are to be avoided and the maximum pressure should not normally be higher than approximately 70 psi on the dough in the manifold cavity. Higher pressures would tend to kill the yeast and the product would not rise as well. It also generates some heat. The preferred range is between 40 and 45 psi pressure. All pressures mentioned herein are gauge pressures.

The manifold assembly 14 is preferably made up of a suitable plastic with the preferred plastic being ultra high molecular weight polyethylene.

The size of the preferred manifold shown is approximately $8\frac{1}{8}$ inches long and 26 inches wide with the inside dimensions being approximately $\frac{3}{4}$ inch less on each side. Thus the width to length ratio is approximately 3. The throughput of dough is between approximately 2,000 pounds per hour (which is a very low rate) up to 12,000 to 13,000 hour with 6,000 to 7,000 pounds per hour being typical. At the present time the devices with which the manifold is used are running from 80 to 100 cuts per minute with some running faster than that. In the future the rates will continue to increase with 150 or more cuts per minute expected in the near future. These number of cuts are multiplied by the number of ports to determine how many dough pieces are being made per minute. Preferably the manifold cavity and integral internal conduits permit laminar flow of the dough therethrough and minimizes any turbulence.

The top and bottom of the interior of the manifold chambers are generally flat and are spaced apart and slightly converge towards one another from the entrance to the exit opening. This convergence or taper is preferably 4 degrees total with the manifold cover having a taper of 2 degrees and the manifold base having a taper of 2 degrees from the horizontal. This will depend somewhat on the inlet size and outlet size of the manifold and the total taper can vary in the range from approximately 2 degrees to approximately 7 degrees. The internal inlet of the opening of the preferred embodiment is 1.8 inches and the outlet is 1.4 inches which matches the inlet and outlet tubes. Thus the height to length ratio of the internal chambers of the manifold is approximately four. The tube sizes and inlet and outlet dimensions of the manifold are matched so as to minimize any ridges when the product flows through.

As the dough moves through the manifold cavity from the inlet, it slightly converges in the vertical dimension because of the taper and considerably diverges along the horizontal dimension with the combined outlet openings being substantially greater than the single inlet opening. This assists in reducing the required pressure on the dough to move it through the manifold assembly.

After the dough has been divided into the individual streams that pass through the integral internal conduits, the individual streams are flowing at approximately equal rates. However, to control the rates to make the divided flows as equal as possible, an adjustable restrictor is introduced in each of the flow paths to fine tune the flow rates for best scaling. These restrictors are provided for in each of the conduits and may be located at any point in the conduits conducting the divided dough streams but preferably the restriction is accomplished by the internal conduit in the manifold assembly being extended into a flexible tubing that is pinched by a pressure bar. If the pressure bar pinches the tubing sufficiently it can also be used to completely cut off an individual stream of dough in the selected individual conduit. This is best shown with reference to FIGS. 5 through 9.

Figure 5:
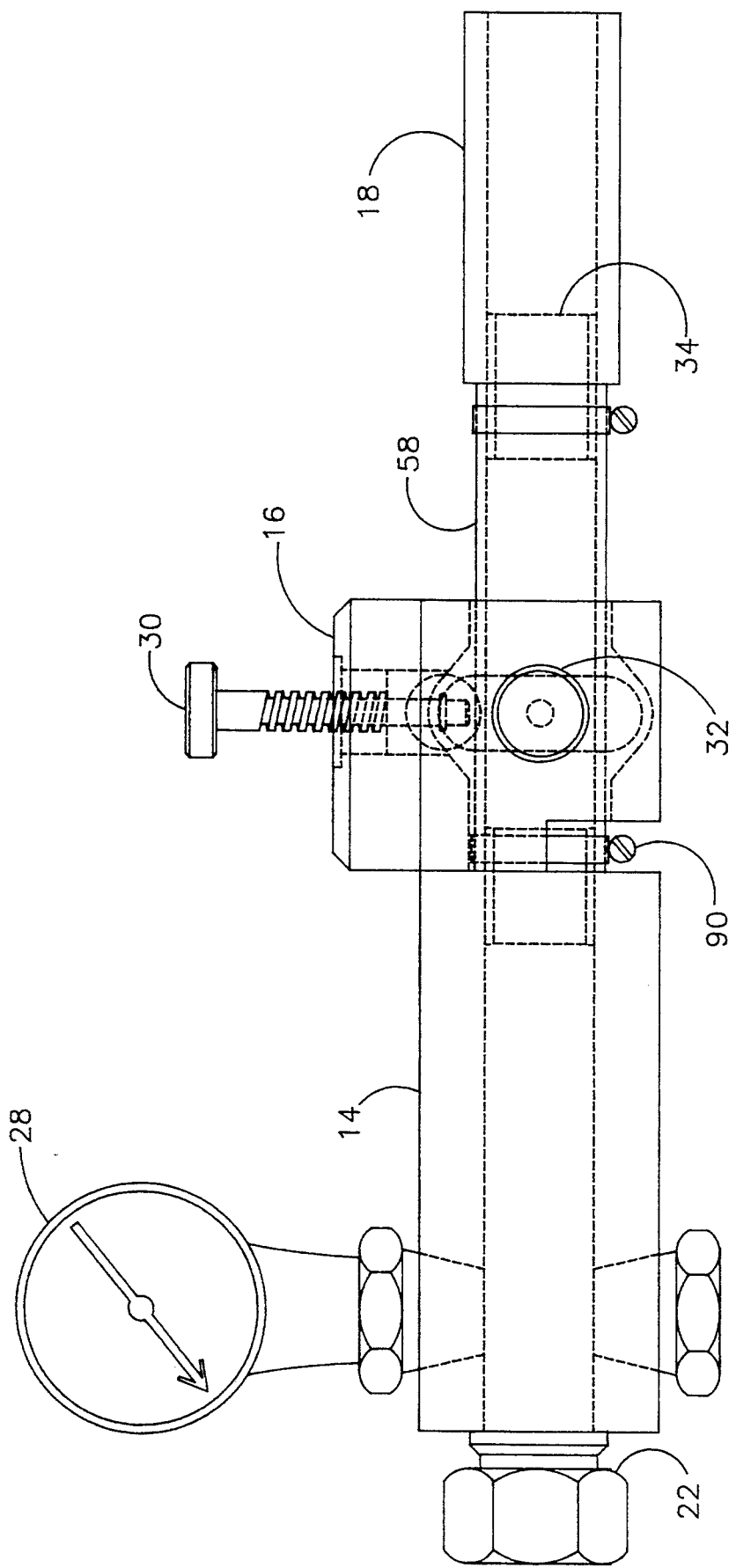
FIG. 5 is a side view of the manifold and valve assembly.
Figure 6:
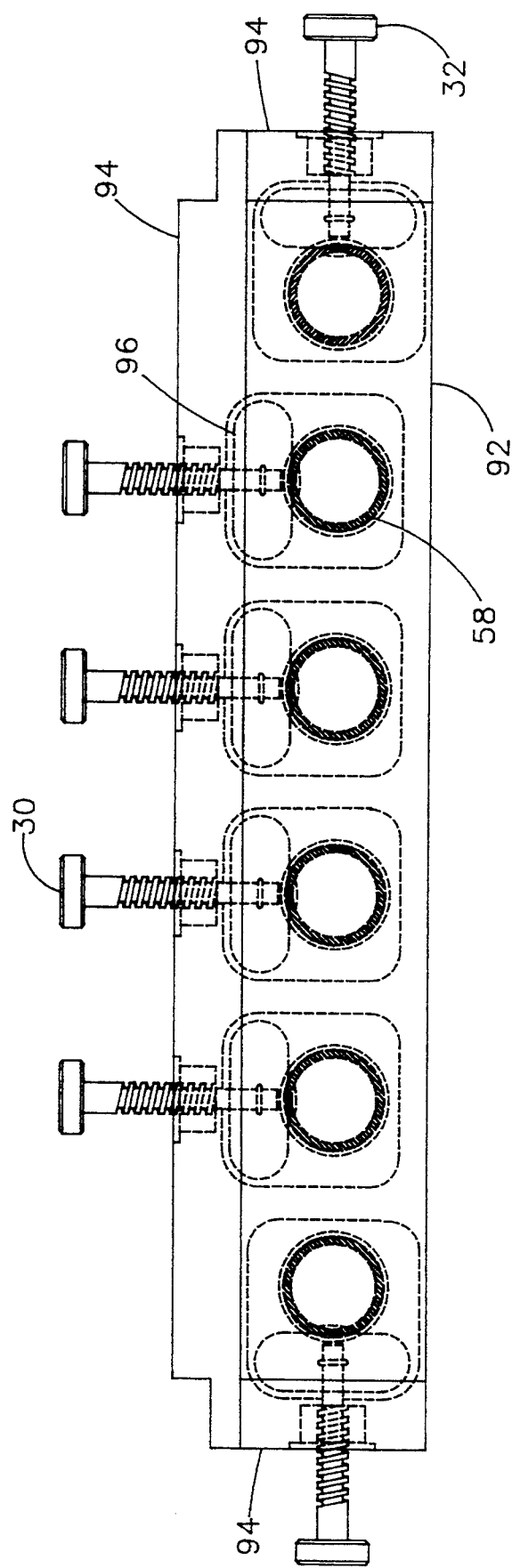
FIG. 6 is an exit end view of FIG. 5.
Figure 7:
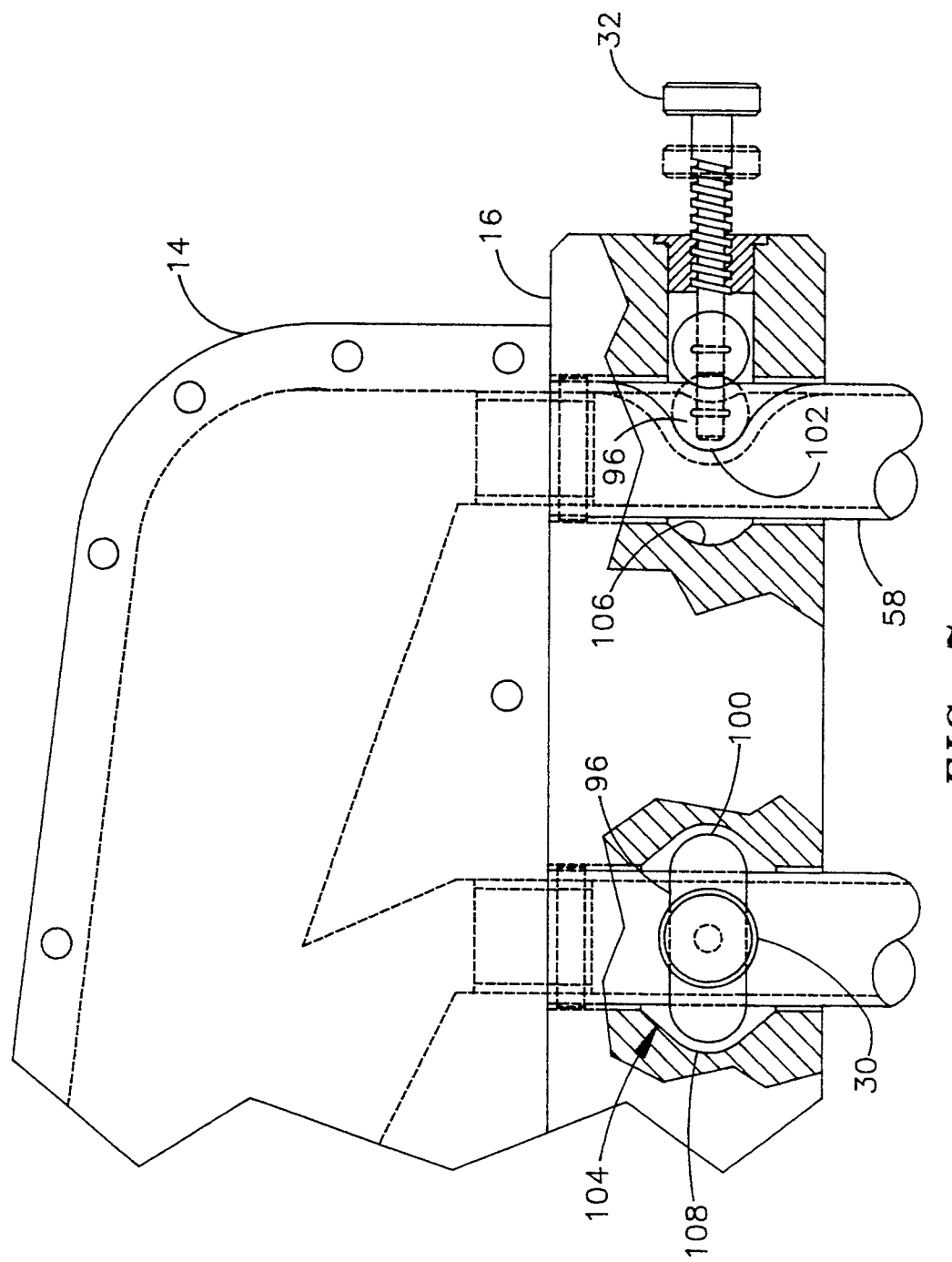
FIG. 7 is a schematic top view of a single valve and a schematic side view of an adjacent valve.
Figure 9:
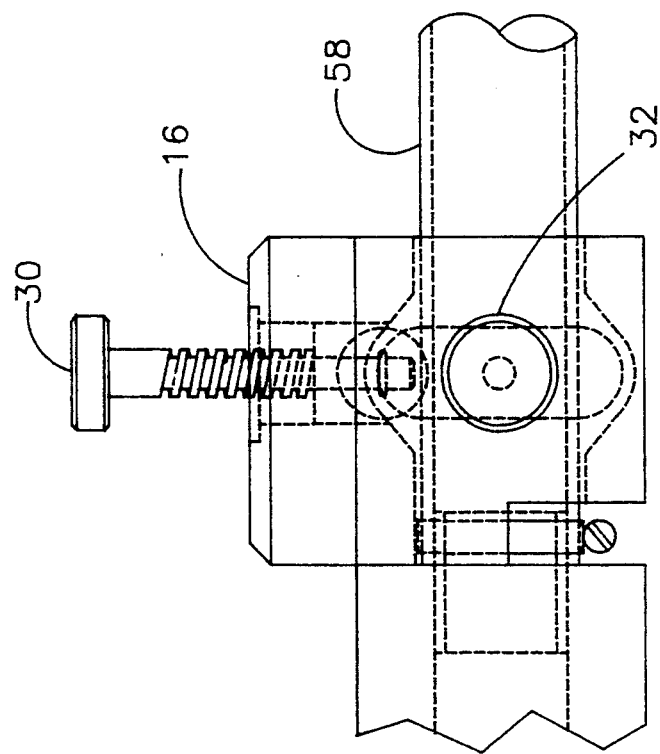
FIG. 9 is a schematic side view of the valve or restrictor assembly showing a single side valve and a single top valve.

Each of the restrictor or pinch valve assemblies 16 are substantially identical except the outermost restrictors on the left side and right side are rotated 90 degrees to the four on the inside as best seen in FIG. 6. With reference to FIG. 5 there is shown a side view of an assembly with the top valve adjusting handle 30 shown from the side and the end valve or side valve adjusting handle 32 shown looking down. The flexible connector tubing 58 is a part of the conduit and an extension of the integral internal conduit contained in the manifold assembly 14. The tubing is connected to the extrusion assembly 18 by connector 34 and connected to the manifold assembly 14 by suitable connectors 90. The flexible tubing 58 is preferably 1½ inch diameter by 3/16 inch wall thickness with a clear flow and approved by the FDA. It is available from Norton Performance Plastics, 150 Dey Road, Wayne, N.J. 07470, USA as their Tygon ® flexible plastic tubing type A60F, 61 durometer.

The restrictor valve assembly 16 has a base block 92 through which the individual tubes 58 pass. Attached to the base block is a threaded cap block 94 for threadily receiving the threads of the top valve adjusting handle 30 or side valve adjusting handles 32. Each of the handles has a knob at the top for manually turning the handle and a threaded section which is received into the cap block. At the lower end of each valve adjusting handle is a pressure bar 96 which is rotatably attached to the lower end of the handle but is not free to slide axially along the handle. This is shown by a well known type of connection at 98 in FIG. 8. The pressure bar has rounded ends 100 and a rounded bottom 102. The pressure bar is received in cavity 104 of the base block 92. The cavity has a rounded bottom 106 best seen in FIG. 7 and two side walls 108 that are complementary to the pressure bar rounded ends 100 so the two side walls function as side tracks 108. Thus, the pressure bar 96 is prevented from rotating in the cavity 104 and is confined to being moved inwardly and outwardly as the adjusting handles are screwed in and out.

Figure 8:
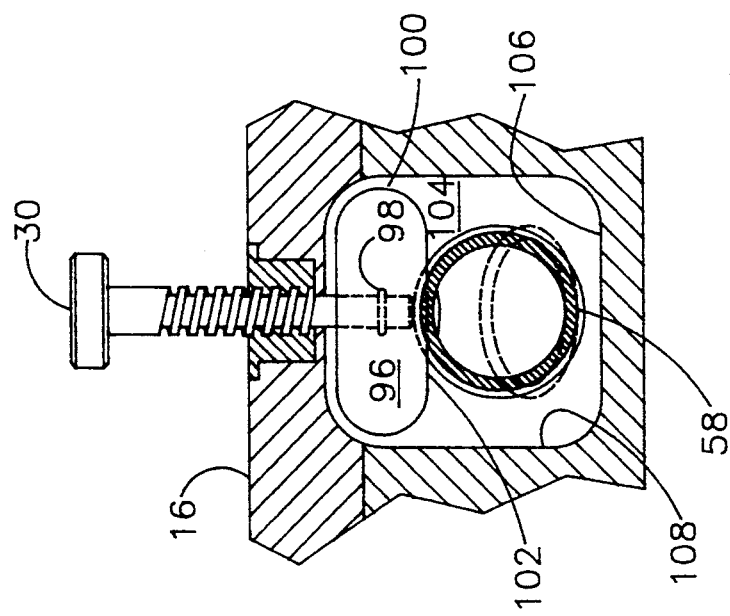
FIG. 8 is an end view of a single valve shown schematically with the tubing shown in two positions.

The rounded bottom end 102 of the pressure bar rides against the tubing 58 and as it moves inwardly collapses the tubing and causes it to function as a restrictor in the passage of dough causing more resistance to such passage. When the pressure bar 96 is fully inward it completely collapses the tubing 58 and causes it to function as a shut off valve. When the adjusting handle is rotated to withdraw the pressure bar 96 the natural resiliency of the tubing 58, together with the pressure on the dough, causes it to return to its fully cylindrical position. The tubing 58 is shown as partially collapsed in FIG. 7 by the solid lines and only slightly collapsed by the dotted lines. In FIG. 8 the dotted lines show the tubing partially collapsed and the solid lines show the tubing only slightly collapsed. As best seen at the right side of FIG. 7, whether the tubing is only slightly collapsed position or more fully collapsed, the tubing still forms a smooth restriction to the dough as it passes therethrough without any sharp or square corners. The smooth passage past the restrictor reduces the likelihood of shearing of the dough.

The base block 92 is preferably machined from polyethylene plastic and is of the same width as the manifold assembly. It is about 3 inches square by about 26 inches wide and makes up the restrictor or pinch valve housing. As best seen from the shape in the left view of FIG. 7, the cavity 104 is of sufficient size to provide an expansion area to allow the flexible tubing 58 to be collapsed and extend its width. Roughly this expansion area is hexagonally shaped.

The apparatus just described causes the dough which enters through a single outlet to be divided and smoothly conducted through six equal streams to the extrusion block. The flow rate of each stream can be fine tuned by adjusting the handle to cause the pressure bar to move against the tubing and partially collapse it creating an increased resistance or restriction on the flow of the dough and achieve the accurate scaling demanded by modern day production. The smooth passageway of the dough through the manifold assembly with minimum pressures and a low surface area to volume ratio handles the dough in a gentle fashion and lessens or obviates problems encountered in the past.

Although the adjusting handles are primarily used for fine tuning the flow rates on occasion they may be adjusted to completely collapse the tubing and cut off the flow. Such occasions may arise when a bakery needs to run a much heavier product or a product that is going to expand horizontally across a belt such as a hot dog roll. On these occasions the flexible tubing must be sufficiently resilient to snap to its original open shape when it is opened again.

It is noted that the pressure bar and other surfaces associated with the tubing are all rounded. When the tubing is pressed to collapse it, it is not damaged or cut.

It would be readily apparent to those skilled in the art that variations could be made in the preferred embodiment without departing from the concepts taught herein. For example, the manifold may be used in a different position than the horizontal in which case terms such as "top" and "bottom" will also change.

It will be apparent from the foregoing description, the accompanying drawings and the appended claims that various modifications in the illustrative embodiment may be made within the scope and spirit of the invention. It is therefore to be understood that within the scope of the appended claims, the invention may be practiced otherwise than as specifically described.

What is claimed is:

1. Apparatus for dividing a mass of dough into a plurality of smaller volumes of substantially uniform weight comprising:
    a pump to provide a source of dough of substantially uniform density under pressure;
    a manifold assembly having an inlet connected to said pump;
    a manifold cavity located in said manifold assembly adjacent said inlet;
    a plurality of internal conduits for dividing a stream of dough into equally flowing streams located in said manifold assembly adjacent said manifold cavity each having a funnel shaped opening;
    an extrusion assembly having a plurality of extrusion openings each having an inlet end connected directly to a single one of said divided stream conduits and each having an outlet end for extruding said divided streams of dough; and
    a cut-off mechanism adjacent said extrusion assembly arranged to cut off said divided streams of dough as they are extruded from said outlet end into a plurality of pieces of dough of substantially uniform weight.

2. The apparatus of claim 1 wherein each of said internal conduits has two side walls of adjacent internal conduits which are adjacent to one another converging upstream to define a divider cutting edge.

3. The apparatus of claim 2 which further includes: a passageway for said dough between said manifold cavity and said extrusion assembly which includes said internal conduits and also includes a flexible tube at least a portion of said passageway; and an adjustable pinching member for pinching said flexible tube at least partially closed.

4. The apparatus of claim 3 wherein said pinching member comprises:

a base having a cavity therein across which said flexible tube traverses;

a cover of said base;

an adjustable pressure member moving in said cavity for pinching said flexible tube between open, partially closed and closed positions; and an operating member to adjust the position of said pressure member.

5. The apparatus of claim 1 wherein said manifold assembly consists of a base and a cover defining an interior chamber which is substantially wider than it is long and of a height substantially less than it is long.

6. The apparatus of claim 5 wherein said interior chamber has a top which is substantially flat and a bottom which is substantially flat, 7. The apparatus of claim 6 wherein said flat top and said flat bottom taper towards one another in the downstream direction at an angle between about 2 and 7 degrees.

8. The apparatus of claim 7 which further includes a divider diverter having a leading knife edge extending between said base and said cover and located between said divider cutting edges and said inlet to said manifold assembly.

9. The apparatus of claim 7 wherein said manifold assembly base and said manifold assembly cover are both of substantially the same height and said internal conduits are monolithic therewith.

10. Apparatus for dividing a mass of dough into a plurality of smaller volumes of substantially uniform weight comprising:

a pump to provide a source of dough of substantially uniform density under pressure;

a manifold assembly having an inlet connected to said pump for dividing said dough into a plurality of streams;

an extrusion assembly having a plurality of extrusion openings each having an inlet end and each having an outlet end for extruding said divided streams of dough;

a cut-off mechanism adjacent said extrusion assembly arranged to cut off said divided streams of dough as they are extruded from said outlet end into a plurality of pieces of dough of substantially uniform weight;

a passageway for dough between said manifold assembly and said inlets in said extrusion assembly which include a flexible tube forming at least a portion of said passageway; and an adjustable pinching member for pinching said flexible tube at least partially closed.

11. The apparatus of claim 10 wherein said pinching member comprises:

a base having a cavity therein across which said flexible tube extends;

a cover for said base;

an adjustable pressure member moving in said cavity for pinching said flexible tube between open, partially closed and closed positions; and an operating member to adjust the position of said pressure member.

12. Apparatus for dividing a mass of dough into a plurality of smaller volumes comprising:

a manifold assembly having an inlet, a base and a cover;

a manifold cavity located in said manifold assembly adjacent said inlet which is substantially wider than it is long and of a height substantially less than it is long and which has a top which is substantially flat and a bottom which is substantially flat;

a plurality of internal conduits located in said manifold assembly adjacent said manifold cavity each having a funnel shaped opening; and two side walls located in each of said internal conduits with all side walls of adjacent internal conduits which are adjacent to one another converging upstream to define a divider cutting edge.

13. The apparatus of claim 12 wherein said flat top and said flat bottom taper towards one another in the downstream direction at an angle between about 2 and 7 degrees.

14. The apparatus of claim 13 which further includes a divider diverter having a leading knife edge extending between said base and said cover and located between said divider cutting edges and said inlet to said manifold assembly.

15. The apparatus of claim 14 wherein said manifold assembly base and said manifold assembly cover are both of substantially the same height and said conduits are monolithic therewith.

* * * * *